US012688112B2

(12) United States Patent
Senchenko et al.

(10) Patent No.: US 12,688,112 B2
(45) Date of Patent: Jul. 21, 2026

(54) QUALITY ANALYSIS OF VISUAL PROGRAMMING SCRIPTING LANGUAGE USING MACHINE LEARNING TECHNIQUES

(71) Applicant: Electronic Arts Inc., Redwood City, CA (US)

(72) Inventors: Alexander Senchenko, Langley (CA); Milan Culibrk, Coquitlam (CA)

(73) Assignee: Electronic Arts Inc., Redwood City, CA (US)

( * ) Notice: Subject to any disclaimer, the term of this patent is extended or adjusted under 35 U.S.C. 154(b) by 210 days.

(21) Appl. No.: 18/194,523

(22) Filed: Mar. 31, 2023

(65) Prior Publication Data

US 2024/0330149 A1     Oct. 3, 2024

(51) Int. Cl.
 *G06F 11/3604* (2025.01)
 *G06F 8/41* (2018.01)
 *G06F 8/71* (2018.01)

(52) U.S. Cl.
 CPC .......... *G06F 11/3616* (2013.01); *G06F 8/427* (2013.01); *G06F 8/71* (2013.01); *G06F 11/3608* (2013.01)

(58) Field of Classification Search
 None
 See application file for complete search history.

(56) References Cited

U.S. PATENT DOCUMENTS 6,199,199 B1 * 3/2001 Johnston ............... G06F 11/324
717/109
8,166,459 B2 * 4/2012 Suenbuel ............. G06F 21/577
717/124

10,740,216 B1 * 8/2020 Parent ................... G06N 20/00
11,573,772 B2 * 2/2023 Kogelman ............... G06F 8/31
11,880,293 B1 * 1/2024 Hendrix ............... G06F 11/362
12,079,689 B1 * 9/2024 Rao ......................... G06F 15/16
2016/0291944 A1 * 10/2016 Jefferson ............... G06F 9/451
2018/0150742 A1 * 5/2018 Woulfe .............. G06F 11/3608
2021/0349910 A1 * 11/2021 Chadha .............. G06F 16/9024
2021/0374229 A1 * 12/2021 Kumar ................... G06N 3/045

(Continued)

OTHER PUBLICATIONS

Qingkai Shi, et al. 2021. Path-sensitive sparse analysis without path conditions. In Proceedings of the 42nd ACM SIGPLAN International Conference on Programming Language Design and Implementation (PLDI 2021). Association for Computing Machinery, New York, NY, USA, 93 (Year: 2021).*

(Continued)

*Primary Examiner* — Jason D Mitchell
(74) *Attorney, Agent, or Firm* — Lee & Hayes, P.C.

(57) ABSTRACT

A quality analysis tool for visual-programming scripting languages uses machine learning to process changes from visual-programming environments. The quality analysis tool can receive data associated with a code submission via a visual-programming scripting language, process the data to identify features in the data that correspond to previously identified defects, apply a pattern matching algorithm to the identified features, determine a risk prediction based on a learned pattern recognition model associated with a pattern in the features, and transmit a notice of predicted risk. The quality analysis tool can train models for use with visual-programming scripting languages and visual-programming environments.

20 Claims, 8 Drawing Sheets

(56)        References Cited

U.S. PATENT DOCUMENTS

| | | | |
|---|---|---|---|
| 2023/0057720 A1* | 2/2023 | Aradhya | G06F 11/0709 |
| 2023/0214192 A1* | 7/2023 | Makhija | G06N 5/01 |
| | | | 717/105 |
| 2023/0297489 A1* | 9/2023 | Mano | G06F 11/3089 |
| | | | 717/126 |
| 2023/0305942 A1* | 9/2023 | Thome | G06F 11/3684 |
| 2023/0350647 A1* | 11/2023 | Hasebe | G06F 8/34 |
| 2023/0385042 A1* | 11/2023 | Obando Chacon | G06F 8/447 |
| 2024/0193072 A1* | 6/2024 | Kanta | G06F 11/0787 |
| 2024/0256425 A1* | 8/2024 | Thome | G06F 8/71 |

OTHER PUBLICATIONS

Jacek Śliwerski, Thomas Zimmermann, and Andreas Zeller. 2005. When do changes induce fixes? SIGSOFT Softw. Eng. Notes 30, 4 (Jul. 2005), 1-5. (Year: 2005).*

K. Howland, J. Good and J. Robertson, "Script Cards: A Visual Programming Language for Games Authoring by Young People," Visual Languages and Human-Centric Computing (VL/HCC'06), Brighton, UK, 2006, pp. 181-186 (Year: 2006).*

Chen, et al., "Applications of Psychological Science for Actionable Analytics," Proceedings of the 2018 26th ACM Joint Meeting on European Software Engineering Conference and Symposium on the Foundations of Software Engineering, 2018, pp. 456-467.

Kondo, et al., "The Impact of Context Metrics on Just-In-Time Defect Prediction," Empirical Software Engineering, No. 25, pp. 890-393.

McIntosh & Kamei, "Are Fix-Inducing Changes a Moving Target? A Longitudinal Case Study of Just-In-Time Defect Prediction," Proceedings of the 40th International Conference on Software Engineering, 2018, 1 pg.

Menzies, et al., "Implications of Ceiling Effects in Defect Predictors," Proceedings of the 4th International Workshop on Predictor Models in Software Engineering, 2008, pp. 47-54.

Parnin & Orso, "Are Automated Debugging Techniques Actually Helping Programmers?," Proceedings of the 2011 International Symposium on Software Testing and Analysis, 2011, pp. 199-209.

Shrikanth, et al., "Early Life Cycle Software Defect Prediction. Why? How?," 2021 IEEE/ACM 43rd International Conference on Software Engineering (ICSE), 2021, pp. 448-459.

Tantithamthavorn, et al., "The Impact of Automated Parameter Optimization on Defect Prediction Models," IEEE Transactions on Software Engineering, vol. 45, No. 7, 2018, pp. 683-711.

Tantithamthavorn, et al., "The Impact of Class Rebalancing Techniques on the Performance and Interpretation of Defect Prediction Models," IEEE Transactions on Software Engineering, vol. 46, No. 11, 2008, pp. 1200-1219.

Wood, T., "Precision and Recall," Retrieved from DeepAI website on Aug. 11, 2020 at <<https://deepai.org/machine-learning-glossary-and-terms/precision-and-recall>>, 14 pgs.

* cited by examiner

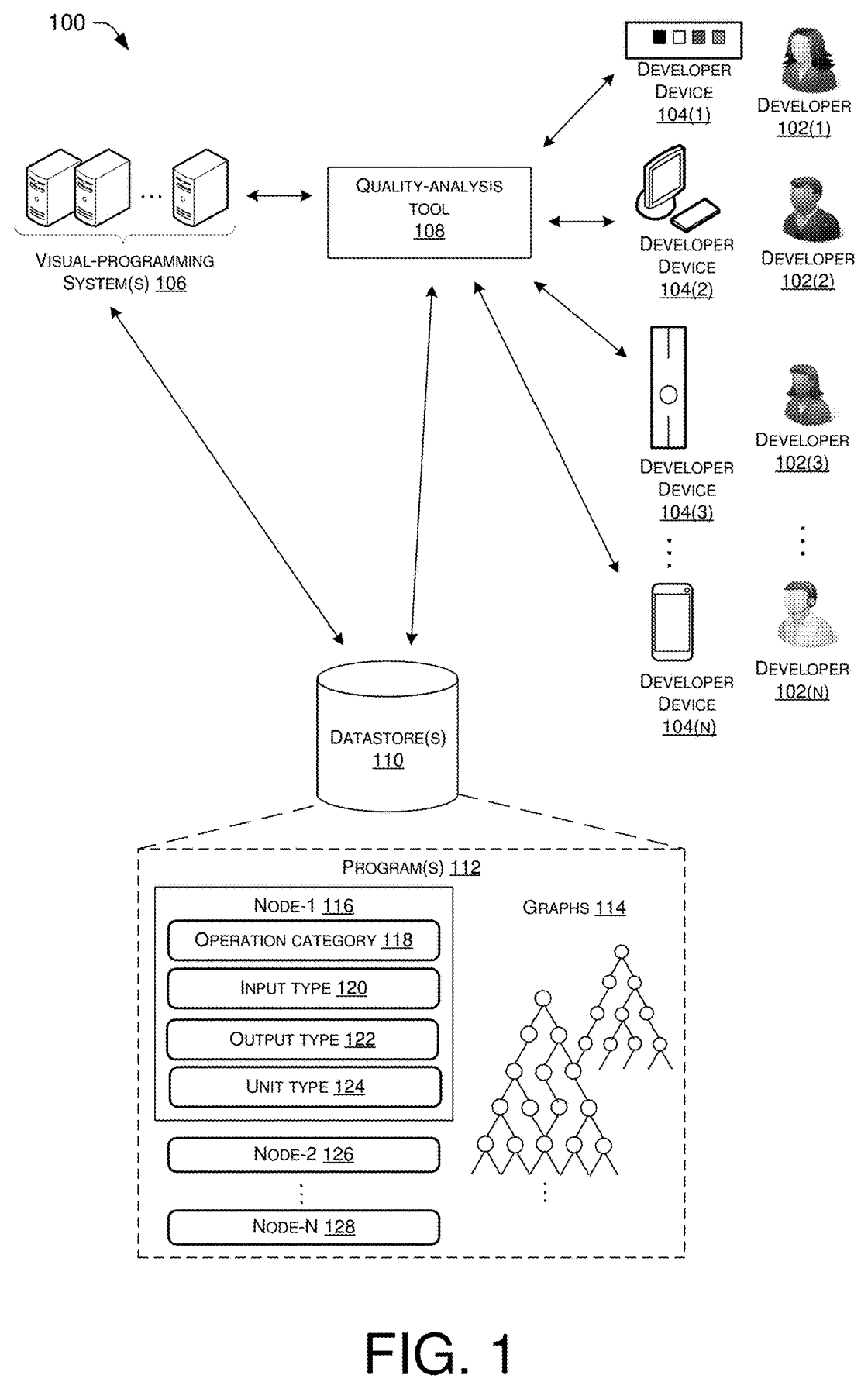

100

QUALITY-ANALYSIS TOOL 108

VISUAL-PROGRAMMING SYSTEM(S) 106

DEVELOPER DEVICE 104(1)

DEVELOPER 102(1)

DEVELOPER DEVICE 104(2)

DEVELOPER 102(2)

DEVELOPER DEVICE 104(3)

DEVELOPER 102(3)

DEVELOPER DEVICE 104(N)

DEVELOPER 102(N)

DATASTORE(S) 110

PROGRAM(S) 112

NODE-1 116

OPERATION CATEGORY 118

INPUT TYPE 120

OUTPUT TYPE 122

UNIT TYPE 124

NODE-2 126

NODE-N 128

GRAPHS 114

FIG. 1

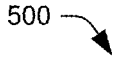
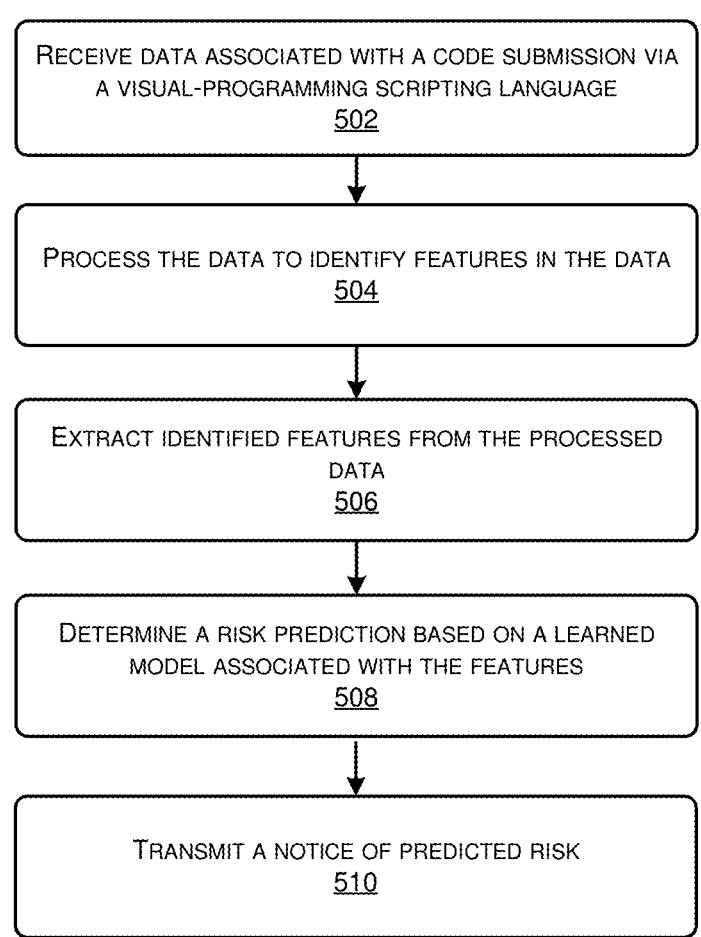
RECEIVE DATA ASSOCIATED WITH A CODE SUBMISSION VIA A VISUAL-PROGRAMMING SCRIPTING LANGUAGE
502
PROCESS THE DATA TO IDENTIFY FEATURES IN THE DATA
504
EXTRACT IDENTIFIED FEATURES FROM THE PROCESSED DATA
506
DETERMINE A RISK PREDICTION BASED ON A LEARNED MODEL ASSOCIATED WITH THE FEATURES
508
TRANSMIT A NOTICE OF PREDICTED RISK
510
FIG. 5

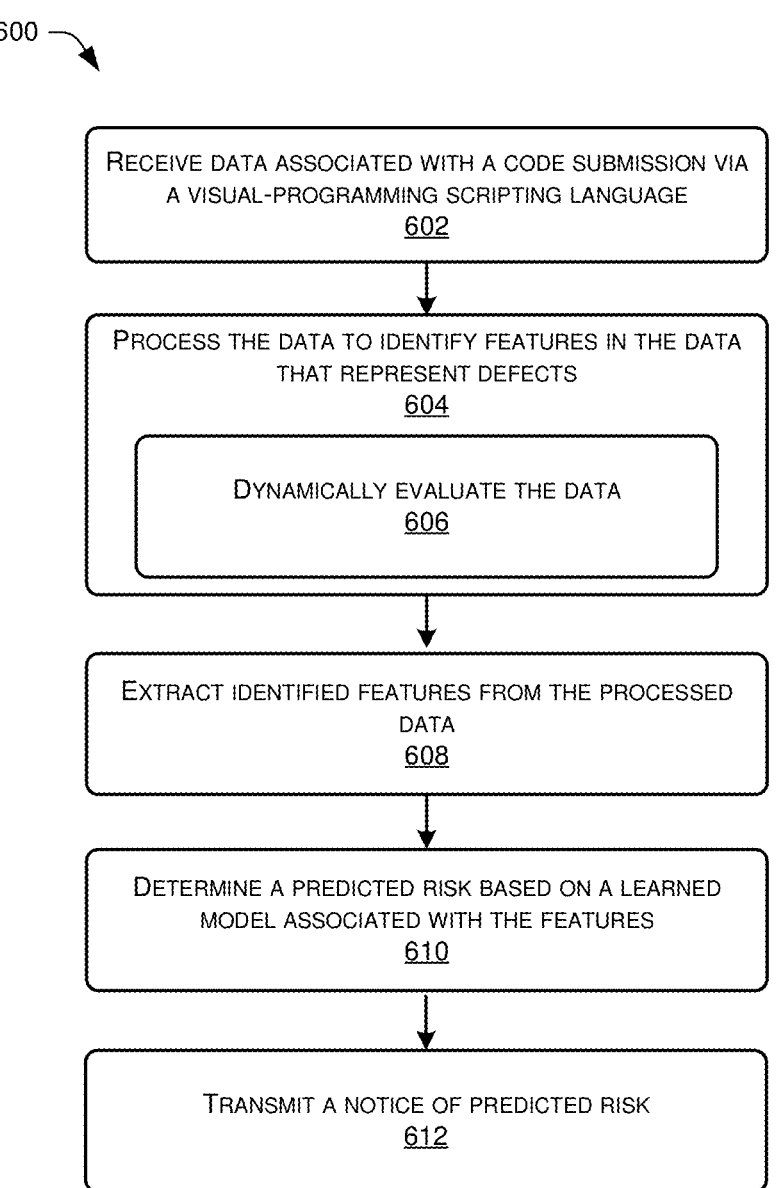

600

RECEIVE DATA ASSOCIATED WITH A CODE SUBMISSION VIA A VISUAL-PROGRAMMING SCRIPTING LANGUAGE
602

PROCESS THE DATA TO IDENTIFY FEATURES IN THE DATA THAT REPRESENT DEFECTS
604

DYNAMICALLY EVALUATE THE DATA
606

EXTRACT IDENTIFIED FEATURES FROM THE PROCESSED DATA
608

DETERMINE A PREDICTED RISK BASED ON A LEARNED MODEL ASSOCIATED WITH THE FEATURES
610

TRANSMIT A NOTICE OF PREDICTED RISK
612

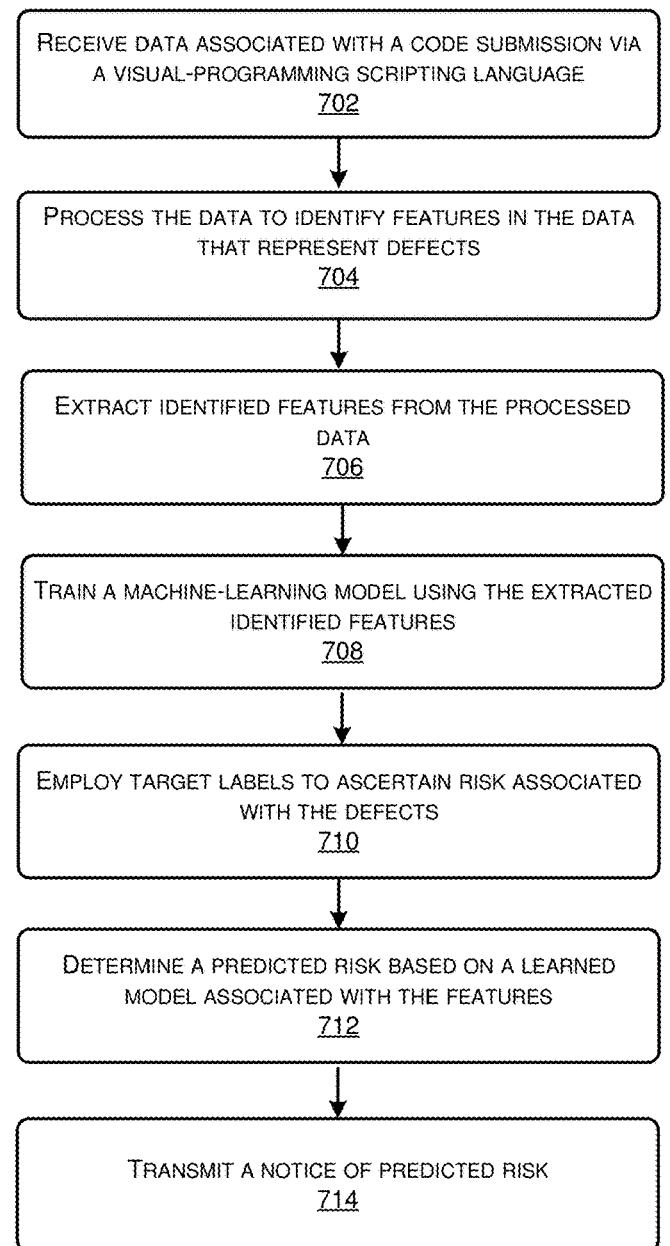

RECEIVE DATA ASSOCIATED WITH A CODE SUBMISSION VIA A VISUAL-PROGRAMMING SCRIPTING LANGUAGE
702

PROCESS THE DATA TO IDENTIFY FEATURES IN THE DATA THAT REPRESENT DEFECTS
704

EXTRACT IDENTIFIED FEATURES FROM THE PROCESSED DATA
706

TRAIN A MACHINE-LEARNING MODEL USING THE EXTRACTED IDENTIFIED FEATURES
708

EMPLOY TARGET LABELS TO ASCERTAIN RISK ASSOCIATED WITH THE DEFECTS
710

DETERMINE A PREDICTED RISK BASED ON A LEARNED MODEL ASSOCIATED WITH THE FEATURES
712

TRANSMIT A NOTICE OF PREDICTED RISK
714

QUALITY ANALYSIS OF VISUAL PROGRAMMING SCRIPTING LANGUAGE USING MACHINE LEARNING TECHNIQUES

BACKGROUND

Visual programming is a method of programming allowing programmers to program using graphical elements as a scripting language rather than text. Visual-programming scripting languages are used by developers and designers with or without a programming background to design various aspects of game logic. However, increased use of visual-programming scripting languages has resulted in significantly increased related defects, which are hard to detect, in part due to complexity the visual-programming scripting language allows. Such defects are hard to detect on compilation, and inability to detect which nodes contain defects negatively impacts the quality of games created with visual-programming scripting languages.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 illustrates an example operating environment for quality analysis of visual-programming scripting language using machine-learning techniques in accordance with examples described herein.

FIG. 5 a flow diagram of an example method of quality analysis of visual-programming scripting language using machine-learning techniques as described herein.

FIG. 6 illustrates a flow diagram of an example method of quality analysis of visual-programming scripting language using machine-learning techniques as described herein.

FIG. 7 illustrates a flow diagram of an example method of quality analysis of visual-programming scripting language using machine-learning techniques as described herein.

DETAILED DESCRIPTION

Figure 2:
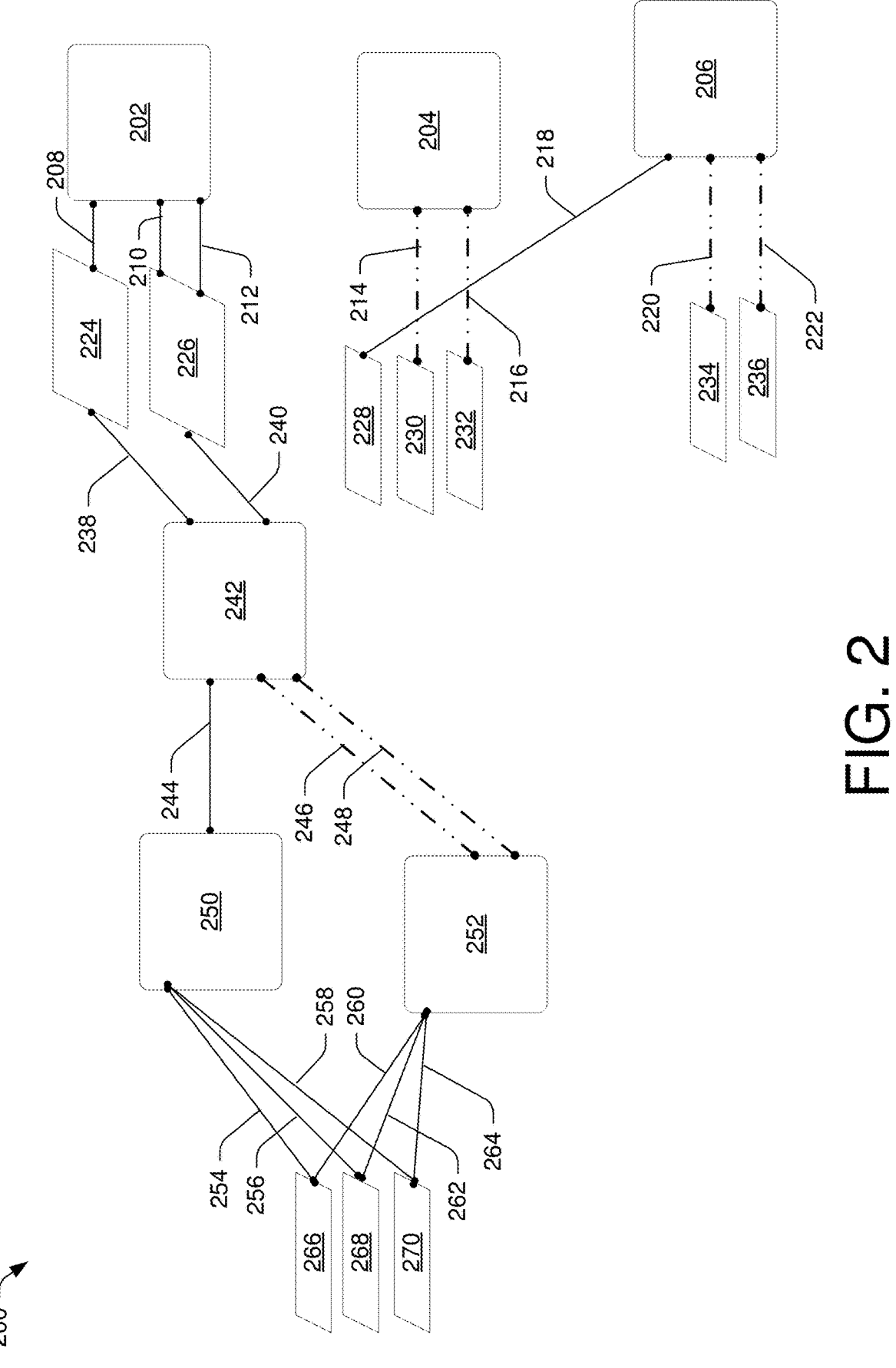
FIG. 2 illustrates an excerpt from an example graphical-user interface of a visual-programming scripting language tool upon which a quality analysis tool as described herein has been run.

Examples in this disclosure describe techniques and mechanisms, e.g., methods, apparatuses, computer-readable media, and/or systems, for quality analysis (QA) of visual-programming scripting language using machine-learning techniques. Such an ability to detect—at compilation time—which nodes negatively impact the quality of a script is needed as increasingly complex graph structures are being created with visual-programming scripting languages.

The dynamic and abstracted nature of visual-programming scripting languages makes applying existing quality verification (QV) techniques a challenge, since those methods are tailored to the less abstracted nature of traditional textual programming files. Unlike traditional textual code, code from visual-programming scripting languages lacks consistent evaluation methods, like static code analysis, for debugging. Additionally, the dynamic and abstracted nature of the visual-programming scripting languages with their associated visual interfaces, also add to the difficulty of detecting and analyzing code defects in visual-programming scripting languages.

Techniques and mechanisms, e.g., methods, apparatuses, computer-readable media, and/or systems described herein can evaluate files, e.g., schematics files of visual-programming scripts from visual-programming scripting languages. In examples, a parser can be configured to extract data representations from visual-programming scripts, and an algorithm, such as via analysis using a sparse-sensitive algorithm, e.g., Sliwerski, Zimmerman, and Zeller (SZZ) analysis, can use that extracted data to detect changes likely to induce bugs. In examples, a machine learning model can assess the output from the algorithm for quality verification.

As described herein, a parser can receive a file of visual-programming scripts from a visual-programming scripting language, e.g., a file from a tool for source-level debugging programs. DBX is one example tool that will be used herein for ease of reference, though the QA of visual-programming scripting language using machine-learning techniques described herein can receive files from other, similar, tools. A tool for source-level debugging can allow developers and QA teams to determine exact nodes that are causing a defect and/or to monitor nodes while the program is executing.

The parser can parse a representation of the file of visual-programming scripts from the visual-programming scripting language, e.g., a file from a DBX-type tool, e.g., an extensible-markup language (XML)-type format file, into schematic representations. Schematic representations can include nodes and connections, objects, external objects, annotations, shortcuts, groups, anchor points, etc. from the DBX file. XML-type formatting being but one example, which is used for convenience herein, and the QA of visual-programming scripting language using machine-learning techniques described herein can be used with other formatting.

In various examples, the parser can extract data associated with size metrics, organization metrics, dependency metrics, path lengths, etc., which represent various aspects of a graph that can affect complexity and understandability of a graph as well as quality of the associated visual code, which can lead to defects or bugs. In examples, the parser can count one or more of a variety of features as size metrics, e.g., objects that manage underlying graph data, node connections, nodes, e.g., nodes that can be used to build game logic, etc. In examples, the parser can count one or more of a variety of aspects termed organization metrics, e.g., annotations, e.g., annotations that can provide custom text for a graph such as a Schematics graph, also, shortcuts from Schematics graphs that can reduce the number of visible connections, groups that group nodes together, e.g., in a Schematics graph, anchor points that pin connections to locations, proxied nodes that can be referenced by connections to connect a node that is elsewhere in the graph, e.g., a Schematics graph. In examples, the parser can count one or more dependency metrics, e.g., external objects that refer to graph data, e.g., Schematics graph data managed by DBX files. In examples, the parser can count path length of nodes and connections which can signify complexity, e.g., of a Schematics graph.

In some examples, the parser can create and/or serialize representations of connections and content of individual objects of a plurality of objects in a schematics DBX file. This serialization can account for changes from changelists so that these parsed representations can be "diffed" to identify changes between changelists. Notably, line diffs cannot be relied on to capture the changes to properties associated with an object because such line diffs may not include a complete encapsulation of the objects' properties, e.g., a complete XML block. Output of the parser, e.g., derived from the schematics DBX file, can provide details of how the code has changed over time to help identify what change(s) caused a defect, e.g., bug in visual programming. In examples, the process given a current changelist can include, determine if the current changelist is "bug fixing," e.g., using AutoPrime, a changelist is "bug fixing" if a Jira issue referenced in a changelist description is a bug: when it is a bug, find earlier changes for edited nodes in the current changelist from previous changelists: for individual of the edited nodes in the current changelist, identify prior change-lists that have touched the edited nodes as suspect bud-inducing changelists.

In various examples, the parser can translate a DBX file into representations for visualization outside the editor, e.g., for Graphviz representations outside of the Schematics editor. In some examples there can be two representations of, e.g., a one-to-one Graphviz representation, which closely resembles a Schematics editor, a simplified Graphviz representation that can simplify how connections are represented by connecting directly to a node.

In examples, the QA tool described herein can train a machine-learning model to classify future submissions in visual-programming language, e.g., as risky, not risky, with a percentage of associated risk, etc., using data output from the parser. The QA tool can train the machine-learning model using one or more of a variety of algorithms including decision trees, random forests, neural networks, etc. In examples, the machine-learning model, the QA tool can analyze history of changes of schematics and can translate it to a data structure such as a decision tree, which the QA tool can use to match patterns in changes. Examples can include a classification model, e.g., a light gradient boosting machine (LightGBM)-type classification model, e.g., with Shapley Additive explanations (SHAP) values. LightGBM uses tree-based learning algorithms as a gradient-boosting framework. Meanwhile, SHAP values enable attributing a prediction to each feature in a machine learning model. In examples, a QA tool as described herein can predict bug defects by creating classifiers with data from changelists, e.g., Perforce changelists and Jira issues of software projects. With the data obtained, it can be split into training data and test data. Training data refers to the initial data used for training the classifiers, and test data refers to the data used to evaluate the performance and accuracy of the classifiers. In examples, techniques described herein can evaluate the performance of a number of classifiers, e.g., logistic regression (LR): nearest neighbor (KNN) (e.g., 3, 4, 5, 6, etc. neighbors): decision tree (DT): random forest (RF): naïve bayes (NB): support vector machines (SVM), etc.

In various examples, the QA tool can evaluate classifiers based on one or more measures, e.g., Brier absolute predictive accuracy: initial number of false alarms (IFA): recall: false positive rate (PF): area under the receiver operating characteristic curve (AUC): distance to heaven (D2H): G-measure (GM), F1 score, confusion matrices, visual-learning curves, etc. In some examples, depending on the classifier chosen, the QA tool can apply more localized measures, e.g., mean squared error, mean absolute error, R-squared, etc. can be used to evaluate regression classifiers. Notably the precision measure that is often used to evaluate the performance of classifiers can be omitted in some examples.

Example benefits of using machine learning for evaluating quality and/or risk associated with the likelihood of a change in the visual-programming code inducing a bug can include one or more of the following. 1) Increased efficiency b/c machine-learning algorithms can automate code evaluation, which can reduce the time and resources devoted to manual visual-script analysis. 2) Improved accuracy b/c ML-based techniques can analyze visual code at a deeper level by identifying patterns and/or trends in the visual code that may not be apparent to humans, e.g., because of the amount and/or complexity of visual code, which can often include many hundreds or thousands of nodes and/or edges. ML-based techniques can reduce the risk of missed bugs or defects in such massive and/or complex data. 3) Early detection of potential defects b/c automated ML-based techniques can be implemented proactively, as part of the code-submission process before the code is added to the code repository. Such ML-based techniques can catch defects that may make it through local developer testing before they infect the code repository, which can lead to application failures. 4) Better management of risk b/c early automated ML-based techniques can improve reliability and functionality of code in the code repository, which can reduce the risk of delaying game delivery. 5) Increased confidence in the code by reducing the risk of unexpected failure or defects for developer(s) and QA teams.

When the QA tool predicts that a submission in visual-programming language is likely to be risky, the QA tool can transmit a notification to alert interested parties including the QA team, the developer(s) and/or designer(s) of the associated scripts, etc. In some examples, the machine-learning model can generate advice and/or recommendations related to the identified defect(s) to be provided associated with the notification.

In examples, a visual-programming scripting language tool can provide for design or entry of visual-programming code without requiring deep programming proficiency. Such visual-programming code can include graph-based instructions using a node and edge syntax that can form a directed graph of operations. The nodes can represent objects, functions, or operations. For example, one or more of the nodes can include a native function call node of the visual-programming language (e.g., add, multiply, sine, cosine, tangent, etc.). The edges between nodes can represent data flows (e.g., input and output of variables or values) and/or control between nodes flows (e.g., to provide a direction to a directed graph).

Using visual-programming scripting language tools, developer(s) can create game-play sequences using visual-scripting blocks, also called visual-scripting cards, which are disconnected from textual code. In examples, an underlying source engine converts the visual-scripting blocks, also called visual-scripting cards, into a binary format. For example, developers can employ visual-programing tools in which the developer can place game events, connect game events, etc. Developers can use such tools to create game-like constructs including loops, branches, jumps, events, listener to events, etc. This incredibly flexible and dynamic environment has led to similarly incredible increases in complexity of associated visual-programming schematics, which can appear as a giant web of connected objects, nodes, events, etc. such that additions and/or changes for maintenance and improvements can have far-reaching, unintended, and unforeseeable side effects in the code.

A QA tool as described herein can work with a variety of data sources that can be involved in the deployment cycle of programs, e.g., games, created using visual-programming scripting language. Example data sources can include data tools that provide semantic data, e.g., Jira, Confluence, etc., and source control systems that provide data about how the code has changed over time, e.g., Perforce, Git, etc. A QA tool as described herein can use, e.g., a version control log to determine exact code changes that introduced a bug or defect and the set of files that were modified due to that change. A QA tool as described herein can capture differences between file revisions that traditional line diffs cannot because traditional line diffs cannot capture context associated with node changes including how node properties change, how nodes connect, etc. A QA tool as described herein can collect data associated with such contextual factors and translate a file, e.g., a schematics DBX file into an object representation that captures changes to nodes and in which various changes can be compared to identify bug or defect-inducing changelists. The QA tool can use results of analysis performed by the QA tool to find bug or defect-inducing changelists as a target for a changelist risk classification model associated with the QA tool.

FIG. 1 illustrates an example operating environment 100 for quality analysis of visual-programming scripting language using machine-learning techniques in accordance with examples described herein.

The example environment 100 can be used by any number of developers and/or designers 102(1)-102(n), hereinafter referred to individually or collectively as developer(s) 102, with their associated developer and/or design devices 104 (1)-104(n), hereinafter referred to individually or collectively as developer device(s) 104 via respective input device(s). Developer device(s) 104 can connect to visual-programming system(s) 106, such that a QA tool 108 can facilitate quality verification on visual-programming language code submission from the developer devices 104(1)- 104(n). Visual-programming system(s) 106 can be used by one or more developer(s) 104 to create program code using visual-programming scripting languages. Examples include games and/or other programs in development, whether the games and/or other programs in development are brand new games and/or other programs, updates to existing games, and/or new versions of existing games and/or other programs. Visual-programming system(s) 106 has one or more associated datastore(s) 110. The datastore(s) 110 store datasets According to some examples, datastore(s) 110 can store a variety of programs 112 including games or other programs, which can be represented in a variety of formats illustrated as graphs 114, though other formats are possible. These formats can visually correspond to backend code. Various types of graphs can by represented by graphs 114 including those known from graph theory such as finite and infinite graphs, and/or directed graphs, etc. Properties of the types of graphs can be employed by the mechanism described herein to propagate and resolve information in graph-based programming languages, which can improve programmer/developer QA, which has lacked previous solutions for VISUAL-PROGRAMMING SCRIPTING LANGUAGE. The illustrated example program 112 includes node-1 116.

As shown, node-1 116 includes a variety of associated attributes such as operation category 118, input type 120, output type 122, and in some instances, unit type 124, though these are but a few examples. An operation category 118 can represent any nodes that can perform similar operations, functions, or processes, but may accept different input/output combinations, and/or have different types for inputs and/or outputs. In the illustrated example, node-1 116 can correspond to a vertex in one or more of the graphs 114. Although their details are omitted for brevity, any number of games or other programs can be included in program(s) 112 including node-2 126 through node-n 128, which can each have additional, different, and/or similar associated attributes like those shown for node-1 116.

Individual developer(s) 102, working on developer device(s) 104 can make changes to programming, e.g., for a game, and submit the changes to the visual-programming system(s) 106 for inclusion in a code repository, which can include datastore(s) 110. In various examples, the QA tool 108 can capture the submission on the developer device(s) 104, in route to visual-programming system(s) 106, and/or at visual-programming system(s) 106. In some examples the QA tool 108 can communicate with, take the place of, and/or be employed in addition to other automated testing programs such as AutoPrime, which test differently.

FIG. 2 illustrates an excerpt 200 from an example graphical-user interface of a visual-programming scripting language tool upon which a quality analysis tool, e.g., QA tool 108, as described herein has been run. Excerpt 200 represents a small part of a giant net of visual-programming cards.

In the illustrated example, blocks represent visual-programming cards corresponding to some nodes in a larger graph, such as from graphs 114. The connecting lines, edges or links between the nodes, represent inputs and outputs from the respective nodes. Of course, the operations shown are used as an example herein for explanation purposes and the usage of the disclosed systems and methods on other functions, operations, programs and so on is contemplated and within the scope of this disclosure.

As illustrated, the graph-based code includes a plurality of nodes and lines 202 to 270. In the illustrated example, node 202 has connection 208 that connects to node 224, connections 210 and 212 that connect to node 226. The solid presentation of connections 208, 210, and 212 can indicate that the code associated with nodes 202, 224, and 226 is valid. That is, the output of the operations associated with node 202 is a valid type to serve as input to the operation associated with nodes 224 and 226.

A user can cause additional nodes to be added via the input interface. In the illustrated example, node 204 is connected with nodes 230, and 232. The dashed presentation of connections 214 and 216 can indicate that the code associated with nodes 230 and 232 has been added, and the connection has been made for the output of node 204 to be an input to nodes 230 and 232, but the connections have not been validated, e.g., the output produced by node 204 may not include available options for input to the nodes 230 and 232. Connecting line 218, which connects node 206 and node 228, shows that each output produced by node 206 is an available option for input to the operation category represented by node 228. Meanwhile, In the illustrated example, node 206 is connected with nodes 234, and 236. The dashed presentation of connections 220 and 222 can indicate that the code associated with nodes 234 and 236 has been added, and the connection has been made for the output of node 206 to be an input to nodes 234 and 236, but the connections have not been validated, e.g., the output produced by node 206 may not include available options for input to the nodes 234 and 236, though the output of node 206 is an option for node 228 as shown by the solid line 218. As shown through the remainder of the illustration, the number of nodes, connections, and associated complexity can continue to increase and can infect nodes and connections that were previously valid.

Figure 3:
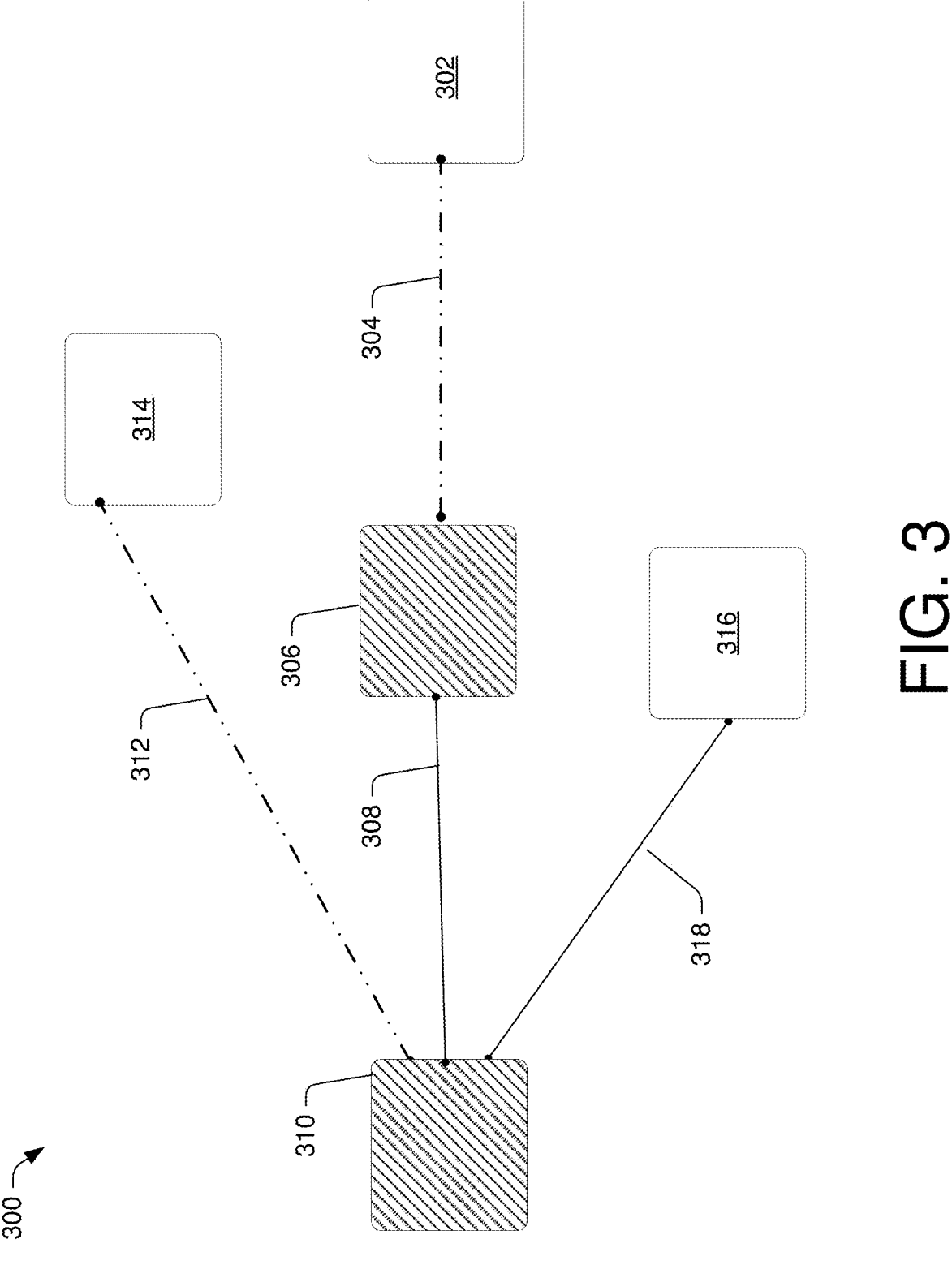
FIG. 3 illustrates an excerpt from an example graphical-user interface of a visual-programming scripting language tool upon which a quality analysis tool as described herein has been run.

FIG. 3 illustrates an excerpt 300 from an example graphical-user interface of a visual-programming scripting language tool upon which a quality analysis tool as described herein has been run.

Machine learning, as employed in the QA tool, can learn patterns of how the cards/nodes are connected and analyze paths associated with the connections. Such paths inform the reach of defects and can flag greater risk associated with longer paths. More particularly, with nodes having higher connection counts.

As illustrated, the visual code includes a plurality of nodes and lines 302 to 318. In the illustrated example, node 302 represents a HintWidget having a blueprint for the type hintwidget, and node 302 has connection 304, which connects to node 306. Node 306 represents an IntToEnum having an enumtype for the type UIButtonHint. Node 306 provides output, via connection 304 to node 302. The pattern of node 302 and the dashed presentation of connection 304 indicate that the code associated with node 306, which is being output to node 302 is not valid for node 302. That is, the output of the operations associated with node 306 is not a valid type to serve as input to the ButtonHint operation associated with node 302.

In the illustrated example, the pattern of nodes 306 and 310, and the solid presentation of connection 308 connected to iconID type at node 310, indicate that the code associated with node 310, which is being output to node 306 is valid for node 306. In the illustrated example, node 310 represents a UIGenericControl, e.g., for BaseWidget, iconID, and label. In the illustrated example, connection 312 connects node 310 to node 314, RimeWidgetEntity Data. The pattern of node 314 and the dashed presentation of connection 312 indicate that the code type associated with BaseWidget at node 306, is not the type expected by Hint at node 314. Meanwhile, the pattern of node 310 indicates that the code associated with node 310 is otherwise considered valid.

In the illustrated example, node 316 represents a RimeLabel having a label type text, and node 316 has connection 318, which connects to label type at node 310. However, as illustrated, node 316 is not validated, e.g., because some node not shown in the excerpt cannot accept a label type text as provided by node 316. Of course, many other permutations are possible.

In examples, QA tools 108 can use various parameters including longest simplified path. In excerpt 300, the longest simplified path is the path from 302 via 304 to 306, then 306 via 308 to 310, then 310 via 312 to 314, which represents three hops affecting four nodes, though, of course, there can be much longer paths in practice, and this is merely an example.

Figure 4:
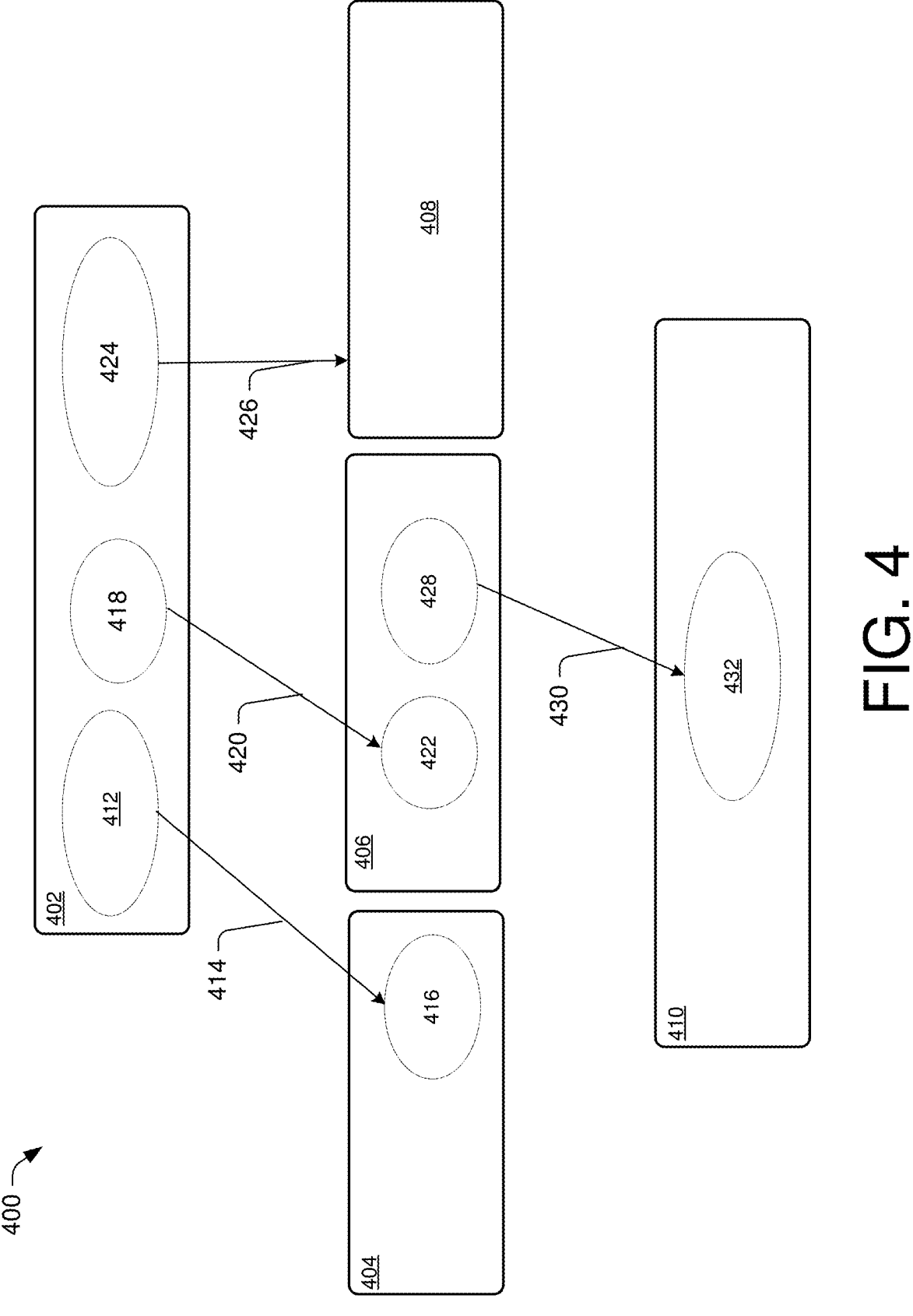
FIG. 4 illustrates an excerpt from an example graphical-user interface of a visual-programming scripting language tool upon which a quality analysis tool as described herein has been run.

FIG. 4 illustrates an excerpt 400 from an example graphical-user interface of a visual-programming scripting language tool upon which a quality analysis tool as described herein has been run. FIG. 4 illustrates and example one-to-one Graphviz representation.

As illustrated, the visual code includes a plurality of nodes 402 to 410 encapsulating respective features and types with associated connections, 412 to 432. In the illustrated example, node 402 represents a GolfGame.UIGenericControlEntityData node, node 404 represents a RimeElementsShared.RimeLabelElementData node, node 406 represents an Entity.Int_toEnumEntityData node, node 408 represents a RimeShared.RimeWidgetEntityData node, and node 410 represents a RimeElementsShared.RimeWidgetReferenceElementData node. Node 402 encapsulates a label feature 412, which, via connection 414, connects to a text type 416 in node 404. Similarly, node 402 encapsulates an iconID feature 418, which, via connection 420, connects to an input type 422 in node 406, and a BaseWidget feature 424 that connects to the node 408. Node 406 produces an output 428 provided via connection 430 to type ButtonHint 432 in node 410.

FIG. 5 illustrates a flow diagram 500 associated with an example method of quality analysis of visual-programming scripting language using machine-learning techniques as described herein.

At block 502, a QA tool for use with visual-programming scripting languages, such as QA tool 108, can receive data associated with a code submission via a visual-programming scripting language. In examples the data can include one or more of code changes, reported defects, feature briefs, etc. In at least one example, a QA tool for use with visual-programming scripting languages, such as QA tool 108, can collect data from various sources. In various examples, sources of the data can include one or more of a version-control system, an issue tracking tool, a semantic data source, etc.

At block 504, the QA tool for use with visual-programming scripting languages can process the data to identify features in the data, e.g., in preparation for analysis. In some examples, the QA tool can process the tool to identify features in the data that represent defects or bugs, which in some instances have been previously identified, e.g., in a machine-learning model. In some examples, the processing can include one or more of parsing the data, cleaning the data, normalizing the data, e.g., to remove irrelevant information, transforming the data into a useable format, and/or dynamically evaluating the data by applying an algorithm to identify a source of visual programming associated with a predicted risk. In at least one example, an algorithm can include a sparse-sensitive algorithm, e.g., a Sliwerski, Zimmerman, and Zeller (SZZ)-type algorithm, which can be used to trace the origin of a defect, e.g., by analyzing version-control history. In some examples, the QA tool for use with visual-programming scripting languages can label at least one of the extracted identified features as a defect.

At block 506, the QA tool for use with visual-programming scripting languages can extract identified features from the processed data. In some examples, the QA tool can extract features that represent defects or bugs from the data. In various examples, features can include metrics related to code churn, complexity of changes, number of bugs introduced in previous changes, etc. In some examples, the QA tool can apply a pattern-matching algorithm to the identified features. In some examples, an applied pattern-matching algorithm includes a Sliwerski, Zimmerman, and Zeller (SZZ)-type algorithm.

In various examples, the QA tool can evaluate a trained model using metrics including accuracy, precision, recall, etc. to assess performance, and the model can be fine-tuned or retrained to improve performance.

At block 508, the QA tool for use with visual-programming scripting languages can determine a risk prediction based on a learned model associated with the identified features. In some examples, the QA tool can determine predicted risk based on a learned pattern-recognition model associated with a pattern in the features. In some examples, the QA tool can apply an algorithm configured to identify a predicted risk from version control history. In various examples, the QA tool can perform ongoing, regular, and/or continuous monitoring, e.g., of code submissions, of updates to the model, etc.

At block 510, the QA tool for use with visual-programming scripting languages can transmit a notice of predicted risk. In various examples, the QA tool can cause the notice to be transmitted to another QA-associated device and/or to the respective developer device(s) 104.

FIG. 6 illustrates a flow diagram 600 of an example method associated with quality analysis of visual-programming scripting language using machine-learning techniques as described herein.

At block 602, a QA tool for use with visual-programming scripting languages, such as QA tool 108, can receive data associated with a code submission via a visual-programming scripting language.

At block 604, the QA tool for use with visual-programming scripting languages can process the data to identify features in the data. In some examples, the QA tool can process the tool to identify features in the data that represent defects or bugs, which in some instances have been previously identified, e.g., in a machine-learning model. In some examples, as illustrated by block 606, the processing includes dynamically evaluating the data by applying an algorithm to identify a source of visual programming associated with a predicted risk.

At block 608, the QA tool for use with visual-programming scripting languages can extract identified features from the processed data. In some examples, the QA tool can extract features that represent defects or bugs from the data. In some examples, the QA tool can apply a pattern-matching algorithm to the identified features.

At block 610, the QA tool for use with visual-programming scripting languages can determine a risk prediction based on a learned model associated with the identified features. In some examples, the QA tool can determine predicted risk based on a learned pattern-recognition model associated with a pattern in the features.

At block 612, the QA tool for use with visual-programming scripting languages can transmit a notice of predicted risk. In various examples, the QA tool can cause the notice to be transmitted to another QA-associated device and/or to the respective developer device(s) 104.

FIG. 7 illustrates a flow diagram of an example method 700 associated with quality analysis of visual-programming scripting language using machine-learning techniques as described herein. At block 702, a QA tool for use with visual-programming scripting languages, such as QA tool 108, can receive data associated with a code submission via a visual-programming scripting language.

At block 704, the QA tool for use with visual-programming scripting languages can process the data to identify features in the data. In some examples, the QA tool can process the tool to identify features in the data that represent defects or bugs, which in some instances have been previously identified, e.g., in a machine-learning model. In some examples, the processing includes dynamically evaluating the data, e.g., by applying an algorithm to identify a source of visual programming associated with a predicted risk.

At block 706, the QA tool for use with visual-programming scripting languages can extract identified features from the processed data. In some examples, the QA tool can extract features that represent defects or bugs from the data.

In some examples, the QA tool can apply a pattern-matching algorithm to the identified features.

At block 708, the QA tool for use with visual-programming scripting languages can train a machine learning model using the extracted identified features.

At block 710, the QA tool for use with visual-programming scripting languages can employ target labels to ascertain risk associated with the defects.

In some examples, the QA tool can label at least one of the extracted identified features as a defect and train the machine learning model using the extracted identified features and the labels, e.g., risky, not risky, determined percentage of risk, etc.

At block 712, the QA tool for use with visual-programming scripting languages can determine a risk prediction based on a learned model associated with the identified features. In some examples, the QA tool can determine predicted risk based on a learned pattern-recognition model associated with a pattern in the features.

At block 714, the QA tool for use with visual-programming scripting languages can transmit a notice of predicted risk. In various examples, the QA tool can cause the notice to be transmitted to another QA-associated device and/or to the respective developer device(s) 104.

It should be noted that some of the operations of methods 500, 600, or 700, can be performed out of the order presented, with additional elements, and/or without some elements. Some of the operations of methods 500, 600, or 700 can further take place substantially concurrently and, therefore, may conclude in an order different from the order of operations shown above. Further, implementations are not limited to the details of the above examples and variations are possible.

Figure 8:
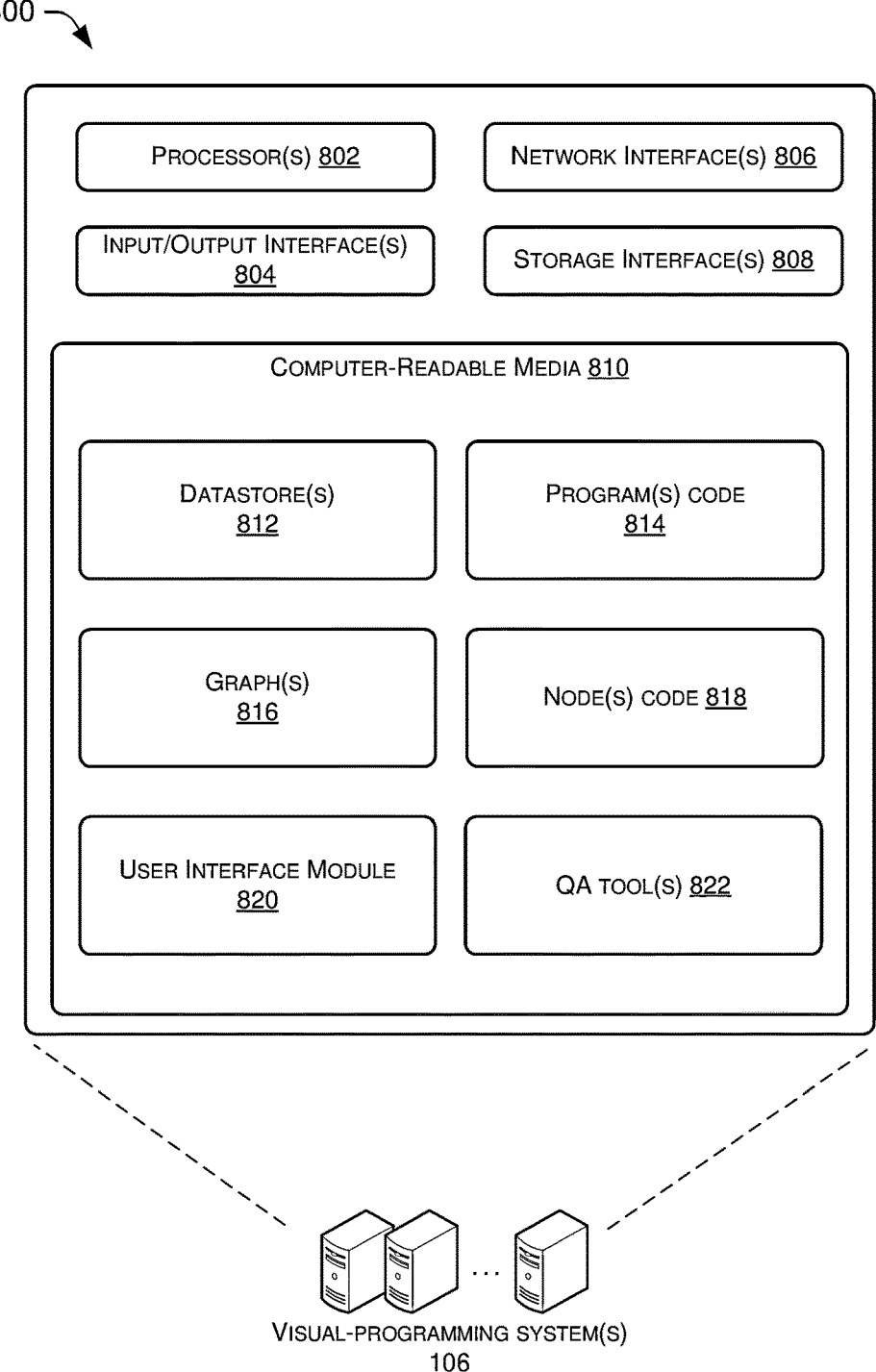
FIG. 8 illustrates a block diagram of example computing device(s) that can implement a quality analysis tool for visual-programming scripting languages using machine-learning techniques in accordance with examples described herein.

FIG. 8 illustrates a block diagram of example computing device(s) 800 of visual-programming system(s) 106 that can implement a quality analysis tool for visual-programming scripting languages using machine-learning techniques in accordance with examples described herein.

The computing device(s) 800 can include one or more processor(s) 802, one or more input/output (I/O) interface(s) 804, one or more network interface(s) 806, one or more storage interface(s) 808, and computer-readable media 810.

In various examples, the processors(s) 802 can include one or more of a central processing unit (CPU), a graphics processing unit (GPU), a microprocessor, a digital signal processor, and/or other processing units or components. Alternatively, or in addition, the processing described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), quantum processors, etc. Additionally, each processor(s) 802 can possess its own local memory, which also can store programs, program data, and/or one or more operating systems. Furthermore, the one or more processor(s) 802 can include one or more cores.

The one or more input/output (I/O) interface(s) 804 can enable the computing device(s) 800 of visual-programming system(s) 106 to detect interaction with programmer/developer device(s) 104 and/or other computing system(s). The I/O interface(s) 804 can include a combination of hardware, software, and/or firmware and can include software drivers for enabling the operation of any variety of I/O device(s) integrated on the computing device(s) 800 of visual-programming system(s) 106 or with which computing device(s) 800 of visual-programming system(s) 106 interact, such as displays, microphones, mouse-input devices, pen-input devices or touch-input devices, speakers, cameras, switches, and any other variety of sensors, or the like. In various examples, the I/O devices of the computing device(s) 800 of visual-programming system(s) 106 can include touch, audio, video, and/or other input functionality.

The network interface(s) 806 can enable the computing device(s) 800 of visual-programming system(s) 106 to communicate via the one or more network(s). The network interface(s) 806 can include a combination of hardware, software, and/or firmware and can include software drivers for enabling any variety of protocol-based communications, and any variety of wireline and/or wireless ports/antennas. For example, the network interface(s) 806 can include one or more of a cellular radio, a wireless (e.g., IEEE 802.1x-based) interface, a Bluetooth® interface, and the like. In some examples, the network interface(s) 806 can connect to the Internet. The network interface(s) 806 can further enable the computing device(s) 800 of visual-programming system(s) 106 to communicate over circuit-switch domains and/or packet-switch domains.

The storage interface(s) 808 can enable the processor(s) 802 to interface and exchange data with computer-readable media 810, as well as any storage device(s) external to the computing device(s) 800 of visual-programming system(s) 106, such as if datastore 110 is implemented in separate computing device(s) associated with visual-programming system(s) 106. The storage interface(s) 808 can further enable access to removable media.

The computer-readable media 810 can include volatile and/or nonvolatile memory, removable and non-removable media implemented in any method or technology for storage of information, such as computer-readable instructions, data structures, program functions, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 810 can be implemented as computer-readable storage media (CRSM), which may be any available physical media accessible by the processor(s) 802 to execute instructions stored on the computer-readable media 810. In one implementation, CRSM can include random access memory (RAM) and Flash memory. In some implementations, CRSM can include, but is not limited to, read-only memory (ROM), electrically erasable programmable read-only memory (EEPROM), or any other tangible medium which can be used to store the desired information, and which can be accessed by the processor(s) 802. The computer-readable media 810 can have an operating system (OS) and/or a variety of suitable applications stored thereon. The OS, when executed by the processor(s) 802 can enable management of hardware and/or software resources of the computing device(s) 800 of visual-programing system(s) 106.

Several functional blocks having instructions, data stores, and so forth can be stored within the computer-readable media 810 and configured to execute on the processor(s) 802. The computer-readable media 810 can have stored thereon a datastore(s) 812, which can correspond to datastore 110, program code(s) 814, which can correspond to program(s) 112, graph(s) 816, which can correspond to graphs 114, node(s) 818, which can correspond to operations node-1 116 through node-n 128, user-interface module 820, QA tools 822, which can correspond to QA tool 108 and/or any number and/or type of associated visual-programming tools. It will be appreciated that each of the blocks 812, 814, 816, 818, 820, and 822 can have instructions stored thereon that when executed by the processor(s) 802 enable various functions pertaining to the operations of the computing device(s) 800 of visual-programming system(s) 106. It should further be noted that one or more of the functions associated with blocks 812, 814, 816, 818, 820, and 822 can operate separately or in conjunction with each other.

The instructions stored in datastore(s) 812, when executed by processor(s) 802, can configure computing device(s) 800 of visual-programming system(s) 106 to allow QA tools 108, 822 to access existing program(s), which can be represented as graphs of nodes and attributes of associated program(s), (e.g., games), including operations node data, connection data, (e.g., types of input, output, and/or units), and/or heuristics data, etc.

The instructions stored in program(s) code 814, when executed by processor(s) 802, can configure computing device(s) 800 of visual-programming system(s) 106 to allow QA tools 108, 822 to access and analyze existing program(s), which can be represented as graphs and attributes of associated program(s), (e.g., games), including node data, connection data, (e.g., types of input, output, and/or units), and/or heuristics data, etc.

The instructions stored in graph(s) 816, when executed by processor(s) 802, can configure computing device(s) 800 of visual-programming system(s) 106 to allow QA tools 108, 822 to traverse graphs according to attributes of associated program(s), (e.g., games), including node data, connection data, (e.g., types of input, output, and/or units), and/or heuristics data, etc.

The instructions stored in operations node(s) code 818, when executed by processor(s) 802, can configure computing device(s) 800 of visual-programming system(s) 106 to allow QA tools 108, 822 to access attributes of programs (e.g., games), including node data, connection data, (e.g., types of input, output, and/or units), and/or heuristics data, etc.

The instructions stored in user-interface module 820, when executed by computing device(s) 800, can configure computing device(s) of visual-programming system(s) 106 to allow QA tools 108, 822 to receive user input associated with graph-based programming and provide information about operations node(s), connection/edge types, (e.g., types of input, types of output, and/or units), and/or heuristics data.

The instructions stored in QA tool(s) 822, when executed by processor(s) 802, can configure computing device(s) 800 of visual-programming system(s) 106 to provide a mechanism for quality analysis of visual-programming scripting language using machine-learning techniques.

The illustrated aspects of the claimed subject matter can be practiced in distributed computing environments where certain tasks are performed by remote processing devices that are linked through a communications network. In a distributed computing environment, program functions can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of systems, methods, apparatuses, and/or computer program products according to examples of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams need not necessarily be performed in the order presented or need not necessarily be performed at all, according to some examples of the disclosure.

Computer-executable program instructions can be loaded onto a general purpose computer, a special-purpose computer, a processor, or other programmable data processing apparatus to produce a particular machine, such that the instructions that execute on the computer, processor, or other programmable data processing apparatus implement one or more functions specified in the flowchart block or blocks. These computer-program instructions can also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. Examples of the disclosure provide for a computer program product, comprising a computer usable medium having a computer-readable program code or program instructions embodied therein, the computer-readable program code adapted to be executed to implement one or more functions specified in the flow diagram block or blocks. The computer-program instructions can also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database can be transmitted to a centralized database capable of receiving data, information, or data records from more than one database or other data storage devices. In some embodiments, the databases shown can be integrated or distributed into any number of databases or other data storage devices.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies: (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy. It should be understood that, as used herein, a player can refer to (i) a person playing or participating in a video game: (ii) systems or devices corresponding to, associated with, operated by and/or managed by a player; and/or (iii) accounts and/or other data or collections of data associated with or corresponding to a player.

Many modifications and other embodiments of the disclosure set forth herein will be apparent having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims. Although specific terms are employed herein, they are used in a generic and descriptive sense only and not for purposes of limitation unless specifically defined herein.

What is claimed is:

1. A system comprising:

one or more processors;

one or more non-transitory computer-readable media storing computer-executable instructions that, when executed by the one or more processors, cause the one or more processors to:

receive data associated with a code submission formatted in a visual-programming scripting language used to create game logic using visual-scripting cards, wherein the visual-scripting cards are disconnected from textual code;

process the data to identify features in the data that correspond to previously identified defects, wherein processing the data includes at least parsing at least one debugging (DBX) file received from a DBX-type tool into at least one schematic representation, the at least one schematic representation including at least an anchor point that pins connections to locations, a proxied node that can be referenced by connections to connect a node that is elsewhere in a graph, and a group that groups nodes together;

apply a pattern-matching algorithm to the identified features;

identify defects associated with the identified features;

determine a context of one or more patterns associated with the defects based at least in part on a longest simplified path in a graph structure of the visual-programming scripting language, the longest simplified path representing a number of hops affecting a plurality of nodes, wherein nodes having higher connection counts are flagged with greater risk;

employ target labels to communicate risk associated with the one or more patterns associated with the defects;

determine predicted risk based on a learned pattern recognition model associated with a pattern in the identified features and the one or more patterns associated with the defects; and transmit a notice of the predicted risk to at least one of a quality assurance device or a developer device, wherein the notice includes advice or recommendations related to the identified defects.

2. The system of claim 1, wherein the data includes at least one of:

code changes;

reported defects; or feature briefs.

3. The system of claim 1, wherein the processing includes at least one of:

cleaning the data;

normalizing the data; or transforming the data.

4. The system of claim 1, wherein the pattern-matching algorithm includes a sparse-sensitive algorithm including a Śliwerski, Zimmerman, and Zeller (SZZ) analysis.

5. The system of claim 1, wherein a source of the data includes at least one of:

a version control system;

an issue tracking tool; or a semantic data source.

6. The system of claim 5, wherein the processing further includes dynamically evaluating the data by applying an algorithm to identify a source of visual programming associated with the predicted risk.

7. The system of claim 6, wherein the algorithm to identify the source of visual programming associated with the predicted risk is configured to:

determine the predicted risk further based at least in part on version control history; and create a blended predicted risk by combining the predicted risk from version control and the predicted risk based on the learned pattern recognition model.

8. The system of claim 1, the one or more computer-readable media storing computer-executable instructions that, when executed by the one or more processors, configure the system to:

train a machine learning model as the learned pattern recognition model using the identified features.

9. A computer-implemented method comprising:

receiving data associated with a code submission formatted in a visual-programming scripting language used to create game logic using visual-scripting cards, wherein the visual-scripting cards are disconnected from textual code;

processing the data to identify features in the data that represent defects, wherein processing the data includes at least parsing at least one debugging (DBX) file received from a DBX-type tool into at least one schematic representation, the at least one schematic representation including at least a shortcut;

extracting the identified features from the processed data that have been identified as representing defects;

identifying defects associated with the identified features;

determining a context of one or more patterns associated with the defects based at least in part on a longest simplified path in a graph structure of the visual-programming scripting language, the longest simplified path representing a number of hops affecting a plurality of nodes, wherein nodes having higher connection counts are flagged with greater risk;

employing target labels to communicate risk associated with the one or more patterns associated with the defects;

determining a predicted risk based on a learned model associated with the identified features and the one or more patterns associated with the defects; and transmitting a notice of the predicted risk to at least one of a quality assurance device or a developer device, wherein the notice includes advice or recommendations related to the identified defects.

10. The computer-implemented method of claim 9, wherein the data includes at least one of:

code changes;

reported defects; or feature briefs.

11. The computer-implemented method of claim 9, wherein the processing includes at least one of:

cleaning the data;

normalizing the data; or transforming the data.

12. The computer-implemented method of claim 9, wherein a source of the data includes at least one of:

a version control system;

an issue tracking tool; or a semantic data source.

13. The computer-implemented method of claim 12, wherein the processing further includes dynamically evaluating the data by applying an algorithm to identify a source of visual programming associated with the predicted risk.

14. The computer-implemented method of claim 13, wherein the algorithm is configured to identify the predicted risk from version control history.

15. The computer-implemented method of claim 9, further comprising:

training a machine learning model using the extracted identified features.

16. The computer-implemented method of claim 9, further comprising:

applying a pattern-matching algorithm to the identified features; and wherein determining the predicted risk is further based on a pattern from the pattern-matching algorithm.

17. The computer-implemented method of claim 16, wherein the pattern-matching algorithm includes a sparse-sensitive algorithm including a Śliwerski, Zimmerman, and Zeller (SZZ) analysis.

18. One or more non-transitory computer-readable media storing computer-executable instructions that, when executed by one or more processors, cause the one or more processors to perform operations comprising:

receiving data associated with a code submission formatted in a visual-programming scripting language used to create game logic using visual-scripting cards, wherein the visual-scripting cards are disconnected from textual code;

processing the data to identify features in the data, wherein processing the data includes at least parsing at least one debugging (DBX) file received from a DBX-type tool into at least one schematic representation, the at least one schematic representation including at least an annotation;

extracting identified features from the processed data;

identifying defects associated with the identified features;

determining a context of one or more patterns associated with the defects based at least in part on a longest simplified path in a graph structure of the visual-programming scripting language, the longest simplified path representing a number of hops affecting a plurality of nodes, wherein nodes having higher connection counts are flagged with greater risk;

employing target labels to communicate risk associated with the one or more patterns associated with the defects;

determining a risk prediction based on a learned model associated with the identified features and the one or more patterns associated with the defects; and transmitting a notice of the predicted risk to at least one of a quality assurance device or a developer device, wherein the notice includes advice or recommendations related to the identified defects.

19. The one or more non-transitory computer-readable media of claim 18, wherein the processing includes at least one of:

parsing the data;

transforming the data; or dynamically evaluating the data by applying an algorithm to identify a source of visual programming associated with the predicted risk.

20. The one or more non-transitory computer-readable media of claim 18, the operations further comprising:

training a machine learning model using the extracted identified features and the target labels.

* * * * *